(12) United States Patent
DeVries et al.

(10) Patent No.: US 10,356,971 B2
(45) Date of Patent: Jul. 23, 2019

(54) FRONT ATTACHMENT LIFT MECHANISM

(71) Applicant: Deere & Company, Moline, IL (US)

(72) Inventors: Alexandra K. DeVries, Beaver Dam, WI (US); Kyle T. Ressler, West Bend, WI (US); Melissa Tolson, Augusta, GA (US)

(73) Assignee: Deere & Company, Moline, IL (US)

( * ) Notice: Subject to any disclaimer, the term of this patent is extended or adjusted under 35 U.S.C. 154(b) by 96 days.

(21) Appl. No.: 14/862,405

(22) Filed: Sep. 23, 2015

(65) Prior Publication Data

US 2017/0079188 A1   Mar. 23, 2017

(51) Int. Cl.
*A01B 59/06* (2006.01)
*B62D 49/02* (2006.01)
*E01H 5/09* (2006.01)

(52) U.S. Cl.
CPC ............ *A01B 59/064* (2013.01); *B62D 49/02* (2013.01); *E01H 5/098* (2013.01)

(58) Field of Classification Search
CPC ......... A01B 59/064; A01B 31/00; E01H 5/04; E01H 5/098; E02F 3/7613; E02F 3/7609; E02F 3/627; E02F 3/6273; E02F 3/7618; B62D 49/02
See application file for complete search history.

(56) References Cited

U.S. PATENT DOCUMENTS

| | | | | |
|---|---|---|---|---|
| 2,426,410 A | * | 8/1947 | Owen | E02F 3/7613 172/710 |
| 2,996,817 A | * | 8/1961 | Bennett | E02F 3/7609 172/817 |
| 3,440,739 A | * | 4/1969 | Manke | E01H 5/098 37/231 |
| 3,588,147 A | * | 6/1971 | Enters | A01B 31/00 172/272 |
| 3,721,025 A | | 3/1973 | Orr | |
| 3,815,687 A | * | 6/1974 | Federspiel | E02F 3/627 172/272 |
| 3,982,643 A | * | 9/1976 | MacGregor | E02F 3/6273 172/273 |

(Continued)

FOREIGN PATENT DOCUMENTS

| | | |
|---|---|---|
| BR | 102012016602 A2 | 8/2014 |
| DE | 69901285 T2 | 12/2002 |

(Continued)

OTHER PUBLICATIONS

Search Report issued in counterpart application No. DE102016217898.9 dated Apr. 27, 2017 (7 pages).

(Continued)

*Primary Examiner* — Jamie L McGowan

(57) ABSTRACT

A front attachment lift mechanism includes a front hitch weldment connectable to a lawn tractor frame and having a pair of side plates for supporting a front attachment. A hitch arm extends upwardly and rearwardly on each side of the frame. A rear weldment includes a pair of rear brackets connected by support bars to each other. Each rear bracket has an upper portion connectable to one of a pair of lift arms on a lawn tractor, and a forward end extending forwardly and downwardly from the upper portion. A wireform assembly is connected between each of the hitch arms and the forward end of one of the rear brackets.

10 Claims, 4 Drawing Sheets

(56) References Cited

U.S. PATENT DOCUMENTS

| | | | | |
|---|---|---|---|---|
| 4,031,968 | A | * | 6/1977 | Krolak ............... E02F 3/7618 172/265 |
| 4,220,210 | A | * | 9/1980 | Degelman ............ E02F 3/627 172/817 |
| 4,436,162 | A | * | 3/1984 | Seibert ............... B62D 49/04 172/439 |
| 4,817,728 | A | | 4/1989 | Schmid et al. |
| 4,825,570 | A | | 5/1989 | Schmid et al. |
| 4,969,533 | A | * | 11/1990 | Holm ............... B62D 21/186 180/273 |
| 5,967,241 | A | * | 10/1999 | Cross ............... E02F 3/7609 172/776 |
| 6,276,119 | B1 | * | 8/2001 | Oshima ............ A01D 34/74 56/15.9 |
| 2006/0236670 | A1 | * | 10/2006 | Glasford ........... A01D 43/02 56/257 |

FOREIGN PATENT DOCUMENTS

| | | |
|---|---|---|
| DE | 602005005899 T2 | 6/2009 |
| EP | 1047296 B1 | 4/2002 |
| GB | 761394 A | 11/1956 |

OTHER PUBLICATIONS

Search Report issued in counterpart application No. GB1616178.8 dated Mar. 23, 2017 (4 pages).

50" Snow Thrower, Model 45-0491. Owners Manual [online]. Agri-Fab, 2012 [retrieved on Jan. 12, 2016]. Retrieved from the Internet: <URL:http://download.sears.com/own/spin_prod_731550312.pdf>.

42-inch Two-Stage Snow Thrower Attachment. Operator's Manual [online]. Cub Cadet, 2006 [retrieved Jan. 12, 2016]. Retrieved from the Internet: <URL:http://www.mowersdirect.com/manuals/190-032-101_operator.pdf>.

Simplicity 42" Single-Stage Snowthrower & 46" Single-Stage Snowthrower. Operator's Manual [online]. Briggs & Stratton Corporation, 2008 [retrieved Jan. 12, 2016], Retrieved from the Internet: <URL:http://www.mowersdirect.com/manuals/TP_100_2545_07_AT_SMA_LO-1_1695297_1695298.pdf>.

Simplicity 42" Two-Stage Snowthrower. Operator's Manual [online]. Briggs & Stratton Corporation, 2008 [retrieved Jan. 12, 2016]. Retrieved from the Internet: <URL:http://www.mowersdirect.com/manuals/1724089_M_LO_1695360.pdf>.

\* cited by examiner

FRONT ATTACHMENT LIFT MECHANISM

FIELD OF THE INVENTION

This invention relates to front attachment lift mechanisms for attaching front attachments such as snow blowers and rotary brushes onto lawn tractors.

BACKGROUND OF THE INVENTION

Front attachment lift mechanisms are used to attach front attachments such as snowblowers and rotary brushes onto lawn tractors. Tractor owners or dealers typically install front attachments seasonally. Existing front attachment lift mechanisms may have a large number of parts including hardware, and require substantial installation time using hand tools. Owners may leave some of the parts on the tractor after the front attachment is removed, or only take off parts that interfere with another attachment such as a rear discharge/rear collection system.

Existing front attachment lift mechanisms typically are connected to a mower deck lift rockshaft inside the frame of the lawn tractor. The same pedal or lever that is used to raise and lower the lift arms for a mid-mounted mower deck also may be used to raise and lower the front attachment. For example, existing front attachment lift mechanisms may include a first rod connected to one of the lift arms and extending forwardly to an intermediate rockshaft. Additionally, a second rod may extend forwardly from the intermediate rockshaft to the front attachment hitch.

A weakness of existing front attachment lift mechanisms is that they only lift from one side of the tractor, resulting in a tendency to lift the front attachment slightly higher on one side than the other. Existing front attachment lift mechanisms also may have a spongey or bouncy lift. Additionally, existing front attachment lift mechanisms must be lowered to ground level and disassembled to adjust, because adjustment points are difficult to access inside the frame of the tractor.

A front attachment lift mechanism is needed having a lower parts count, and a simplified method for installation without tools. A front attachment lift mechanism is needed in which all of the parts come off with the front attachment. A front attachment lift mechanism is needed that lifts evenly on both sides, without a spongey or bouncy lift. A front attachment lift mechanism is needed that may be adjusted easily without disassembly.

SUMMARY OF THE INVENTION

A front attachment lift mechanism includes a front hitch weldment, a pair of wireform assemblies, and a rear weldment. One of the wireform assemblies may be connected to a left side of the rear weldment and the other to the right side of the rear weldment. The left and right sides of the rear weldment may be removably attached to the left and right lift arms on a tractor. Each wireform extends forwardly over the lawn tractor's front axle to a front hitch weldment.

DESCRIPTION OF THE PREFERRED EMBODIMENT

Figure 1:
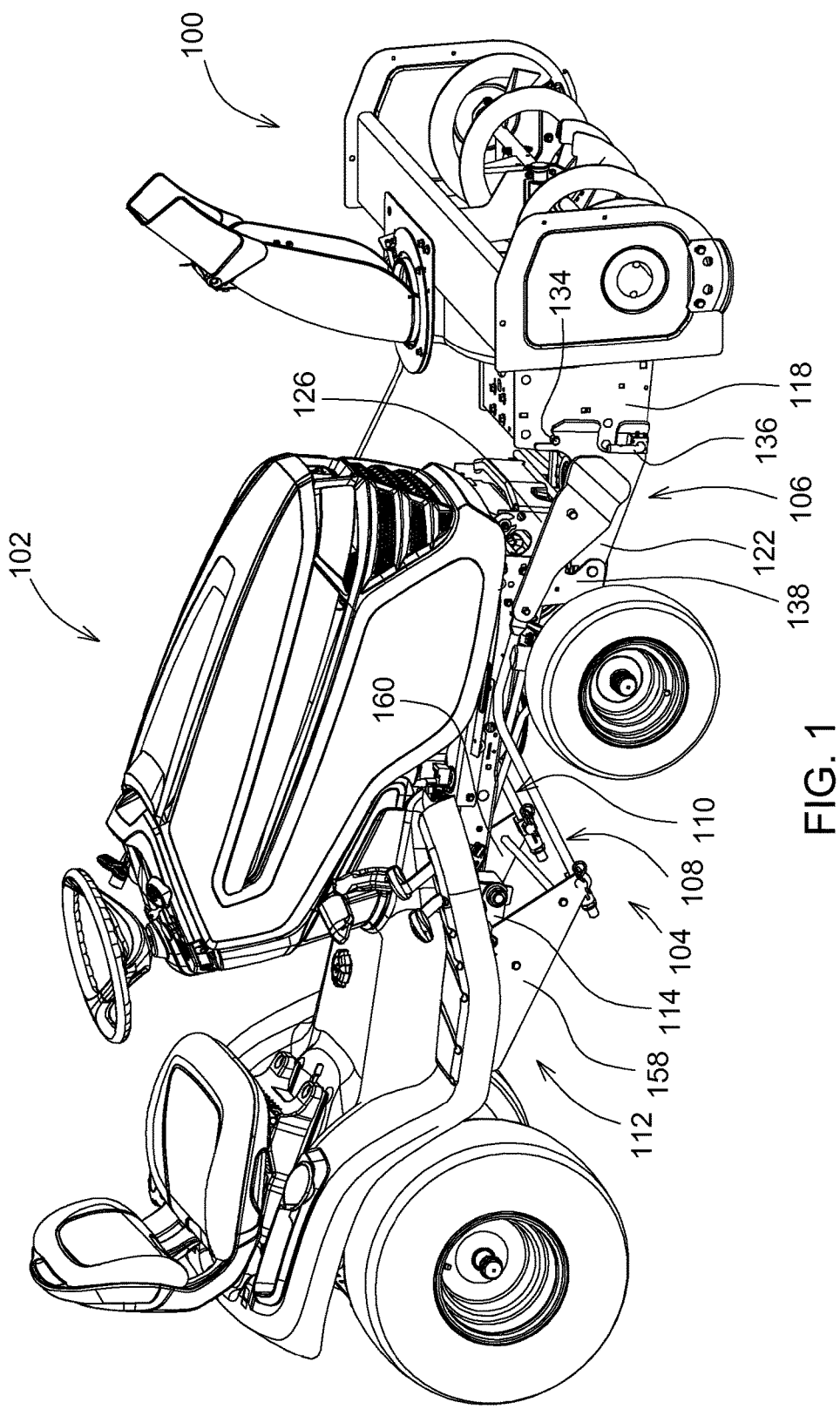
FIG. 1 is a perspective view of a lawn tractor with a front attachment lift mechanism supporting a snowblower according to a preferred embodiment of the invention.
Figure 2:
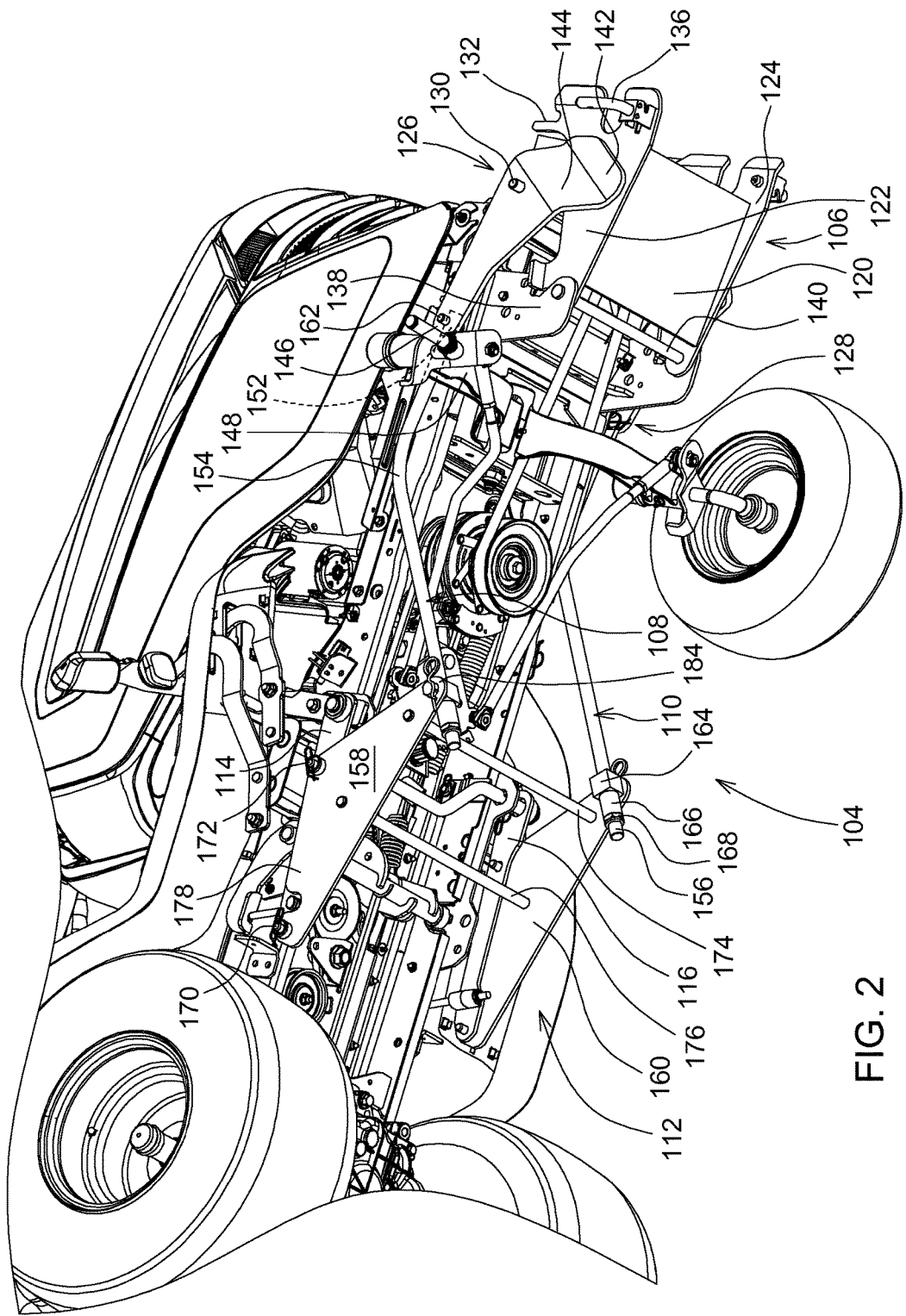
FIG. 2 is a bottom perspective view of a front attachment lift mechanism on a lawn tractor according to a preferred embodiment of the invention.

In a preferred embodiment shown in FIGS. 1-4, snowblower 100 may be attached to the front of lawn tractor 102 using front attachment lift mechanism 104. Other front attachments such as rotary brooms also may be attached using the front attachment lift mechanism of the present invention. A front attachment may be powered with a belt drive from the tractor or a front PTO. Front attachment lift mechanism 104 may include front hitch weldment 106, two wireform assemblies 108, 110, and rear weldment 112 that mounts onto a tractor's lift arms 114, 116.

Figure 3:
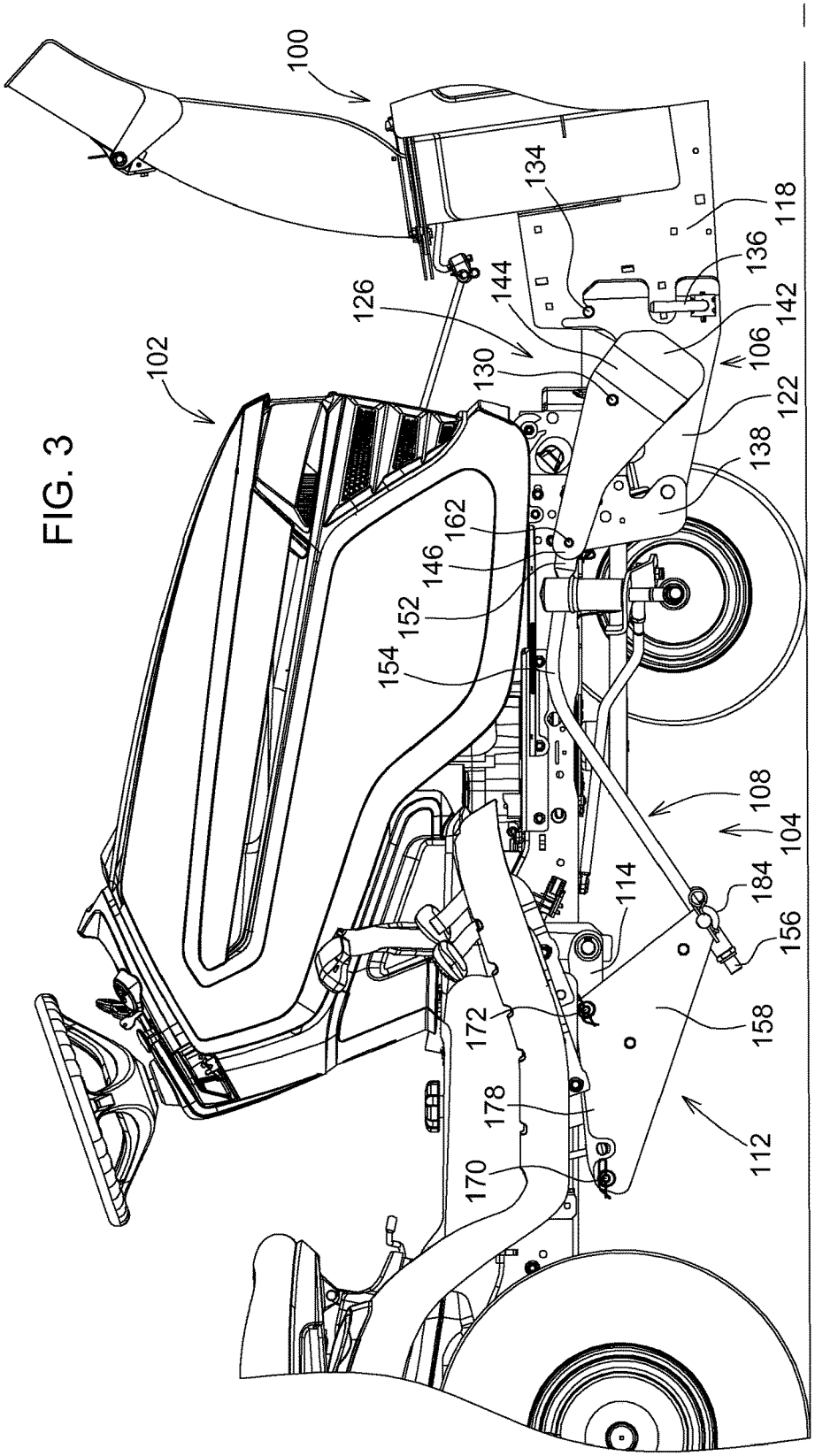
FIG. 3 is a side view of a lawn tractor with a front attachment lift mechanism with a snowblower in a raised position according to a preferred embodiment of the invention.
Figure 4:
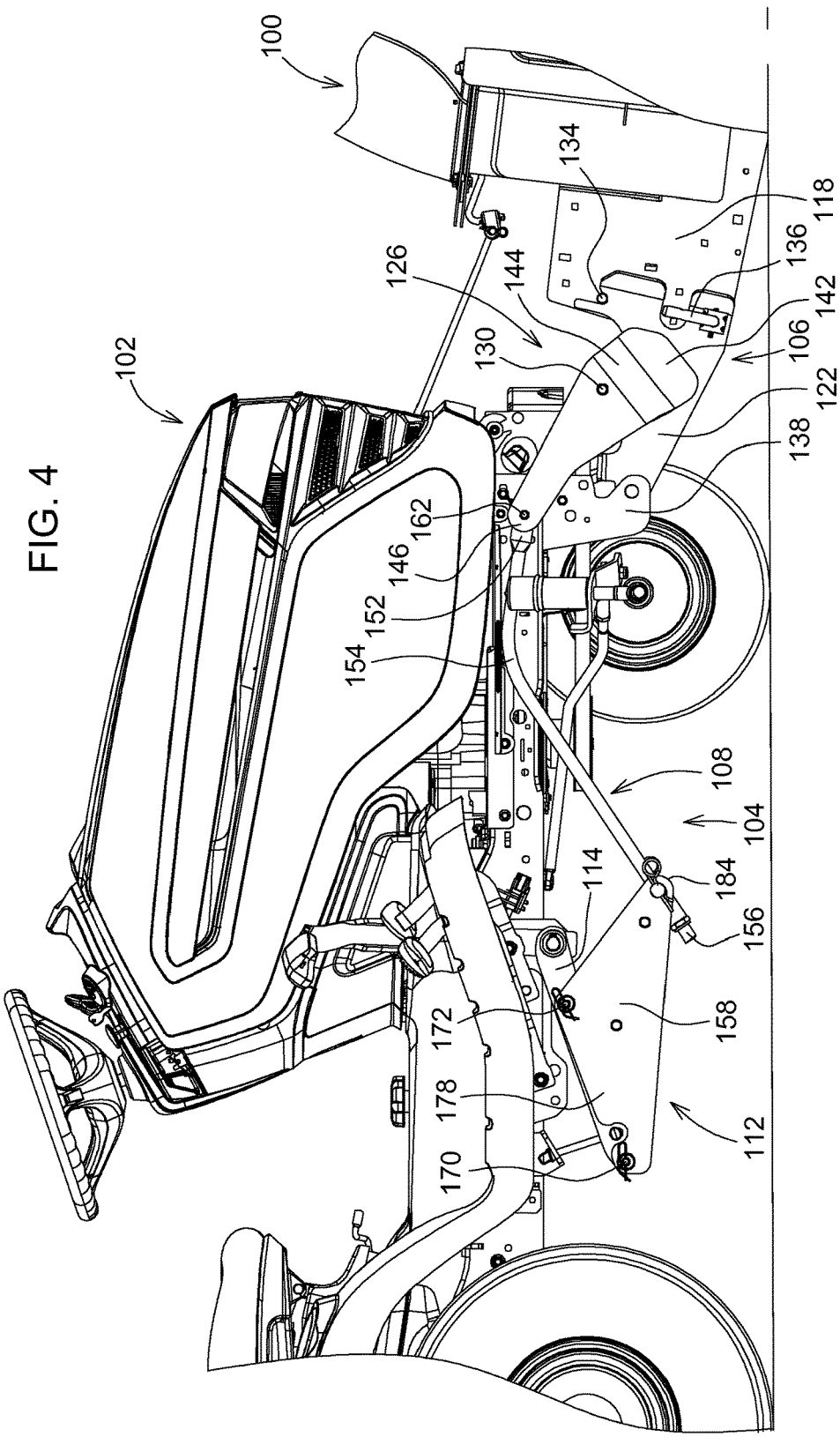
FIG. 4 is a side view of a lawn tractor with a front attachment lift mechanism with a snowblower in a lowered position according to a preferred embodiment of the invention.

In one embodiment, front attachment lift mechanism 104 may include front hitch weldment 106 which provides an interface between the lift mechanism and attachment housing 118. The front hitch weldment may be a steel weldment including base 120, a pair of side plates 122, 124, a pair of hitch arms 126, 128, and support bar 130 welded between the two hitch arms. The pair of side plates may be steel plates that are generally vertically aligned and parallel to each other. Base 120 may connect the side plates together. To fasten the snowblower or other attachment, each side plate may have one or more slots 132 that hold one or more pins 134 projecting outwardly from the attachment housing. Additionally, locking pin 136 may be on a forward portion of a side plate and may pivot to engage and secure the attachment housing to the side plate. Hitch pin 140 may be inserted through both side plates and both sides of front draft bracket 138, and may connect and secure the front hitch weldment to the lawn tractor frame so the front hitch weldment may pivot respect to the frame from a raised position to a lowered position, as shown in FIGS. 3 and 4. Each hitch arm may be a steel plate with a forward end 142 welded to one of the side plates, an outward bend 144, and a rearward end 146. Support bar 130 may connect the pair of hitch arms to each other at a location above the side plates, between the outward bend 144 and rearward end 146 of each hitch arm. Each hitch arm may extend upwardly and rearwardly from the outward bend to the rearward end which may be positioned vertically above the side plates, front draft bracket 138 and front axle 148.

In one embodiment, front attachment lift mechanism 104 may include a pair of wireform assemblies 108, 110 that connect front hitch weldment 106 to rear weldment 112. One of the wireform assemblies may be on each side of the lawn tractor. The two wireform assemblies may be identical and interchangeable, and each may have a thickness of about ¾ inch. Each wireform may have a forward end 152 connecting to one of hitch arms 126, 128, a single bend 154, and a rearward end 156 connecting to one of rear brackets 158, 160. Pivotable connections may be provided at the wireform's forward and rearward ends. For example, the forward end of each wireform may be flattened, and pin 162 may be inserted through a hole in the flattened forward end of the wireform and the rearward end of the hitch arm. The rearward end of each wireform may be threaded, and trunion 164, spacer 166 and locknut 168 may be used to pivotably connect the threaded rearward end with a hole in a rear bracket, allowing adjustment of the wireform's length relative to the rear bracket. The pair of wireforms may transfer motion of the lift arms to the front hitch, which can raise and lower the front attachment.

In one embodiment, front attachment lift mechanism 104 may include rear weldment 112 consisting of a pair of rear brackets 158, 160 connected by support bars 174, 176. The pair of rear brackets may be steel plates that are generally vertically aligned and parallel to each other. Each of the rear brackets may have an upper portion 178 connected to one of the lift arms 114, 116 on the tractor, and may extend forwardly and downwardly from the upper portion to a forward end 184. For example, each rear bracket may be generally triangular in shape. Support bars 174, 176 may connect the pair of rear brackets together, providing rigidity to the rear weldment structure. Additionally, the support bars may be used by an operator to help manually lift and position the rear weldment into position for connection to the lift arms on the tractor without requiring use of tools. Each of the rear brackets may be attached to one of the pair of lift arms. For example, the upper portion 178 of the first or right side rear bracket may be connected to the right side lift arm with weld pins 170, 172. This first or right side rear bracket may have weld pins that are welded to the upper portion of the rear bracket, preferably at least about 6 inches apart and corresponding to holes in the right side lift arm. The weld pins may be inserted through holes in the right side lift arm, and secured with a clip. The rear weldment may be designed so that when the weld pins on the first or right rear bracket are inserted through the right side lift arm, the left side rear bracket will be in alignment with the left side lift arm. Free pins may be inserted through corresponding holes in the left side rear bracket and the left side lift arm, and the free pins may be secured with a clip. The left and right sides may be reversed, or free pins may be used to connect both rear brackets to the lift arms. The forward end of each rear bracket may be pivotably connected to one of the wireforms using trunion 164, spacer 166 and locknut 168 as discussed above.

Thus, the front attachment lift mechanism may be installed quickly and easily from a lawn tractor without tools, and also removed without leaving parts on the lawn tractor. Additionally, the front attachment lift mechanism provides a level lift for the front attachment and does not have a spongey or bouncy lift. It also may be adjusted without lowering it to ground level or disassembled.

Having described the preferred embodiment, it will become apparent that various modifications can be made without departing from the scope of the invention as defined in the accompanying claims.

The invention claimed is:

1. A front attachment lift mechanism, comprising:
a front hitch weldment connectable to a lawn tractor frame and having a pair of side plates for supporting a front attachment and a hitch arm extending upwardly and rearwardly on each side of the frame;
a rear weldment having a pair of rear brackets connected by support bars to each other, each rear bracket releasably engaged to one of a pair of lift arms that are pivoted to raise and lower the front attachment or a mid-mounted attachment under the frame of a lawn tractor, each rear bracket extending forwardly and downwardly from the lift arm; and
a pair of wireform assemblies, each wireform assembly connected between one of the hitch arms and one of the rear brackets.

2. The front attachment lift mechanism of claim 1 wherein each rear bracket is generally triangular in shape.

3. The front attachment lift mechanism of claim 1 further comprising a plurality of weld pins on the upper portion of one of the rear brackets and insertable through a plurality of holes in one of the lift arms.

4. The front attachment lift mechanism of claim 1 wherein each wireform assembly has a single bend and is pivotably connected between one of the hitch arms and the forward end of one of the rear brackets.

5. A front attachment lift mechanism, comprising:
a pair of wireform assemblies; one of the wireform assemblies connected to a left side of a rear weldment and the other to a right side of the rear weldment, the left and right sides of the rear weldment removably attached to and extend forwardly and downwardly from a left lift arm and a right lift arm that are actuated manually by a foot pedal to raise and lower either a front attachment or a mid-mounted mower deck under a lawn tractor; each wireform extending forwardly over a front axle of the lawn tractor to a front hitch weldment.

6. The front attachment lift mechanism of claim 5 wherein the left and right sides of the rear weldment are removably attached to the left and right lift arms by weld pins.

7. The front attachment lift mechanism of claim 5 wherein the front hitch weldment includes a pair of hitch arms extending rearwardly and upwardly from the frame of the lawn tractor.

8. A front attachment lift mechanism, comprising:
a front weldment that is removably and pivotably secured to the front of a lawn tractor frame so that a front attachment may be secure thereto and may be moved between a raised position and a lowered position; the front weldment having a pair of rearwardly extending hitch arms; and
a pair of wireform assemblies extending from the hitch arms rearwardly to a rear weldment connected to and extending downwardly and forwardly from a pair of lift arms positioned under the lawn tractor that may be used to raise and lower the front attachment or a mid-mounted implement using a foot pedal; the rear weldment including a pair of rear brackets that are vertically aligned and connected to each other by support rods.

9. The front attachment lift mechanism of claim 8 wherein each of the rear brackets includes an upper portion connected to a lift arm and a forward end connected to a wireform assembly.

10. The front attachment lift mechanism of claim 8 wherein each of the wireform assemblies extends rearwardly over a front axle of the lawn tractor.

\* \* \* \* \*